United States Patent [19]

Suzuki

[11] 4,233,010
[45] Nov. 11, 1980

[54] ORIENTATION-BLOW MOLDING EQUIPMENT

[75] Inventor: Sadao Suzuki, Tokyo, Japan

[73] Assignee: Yoshino Kogyosho Co. Ltd., Tokyo, Japan

[21] Appl. No.: 973,439

[22] Filed: Dec. 26, 1978

[30] Foreign Application Priority Data

Dec. 27, 1977 [JP] Japan ................... 52-159155

[51] Int. Cl.³ .......................................... B29C 17/07
[52] U.S. Cl. .................................. 425/143; 264/535; 425/526; 425/534; 425/540
[58] Field of Search ............... 425/143, 526, 534, 540; 264/535; 432/11, 124

[56] References Cited

U.S. PATENT DOCUMENTS

| | | | |
|---|---|---|---|
| 3,079,637 | 3/1963 | Marzillier | 425/526 X |
| 3,872,203 | 3/1975 | Yoshikawa et al. | 425/526 X |
| 3,997,642 | 12/1976 | Yoshikawa et al. | 264/535 X |
| 4,035,463 | 7/1977 | Rosenkranz et al. | 264/535 X |
| 4,036,925 | 7/1977 | Kauffman et al. | 264/535 X |

Primary Examiner—Jan H. Silbaugh
Attorney, Agent, or Firm—Stevens, Davis Miller & Mosher

[57] ABSTRACT

In orientation-blow molding equipment, improved heating equipment is used for evenly and uniformly heating an injection molded piece under optimum temperature conditions for the succeeding biaxial orientation, with the aid of an improved jig which contributes to an efficient reheating and molding of the piece.

10 Claims, 11 Drawing Figures

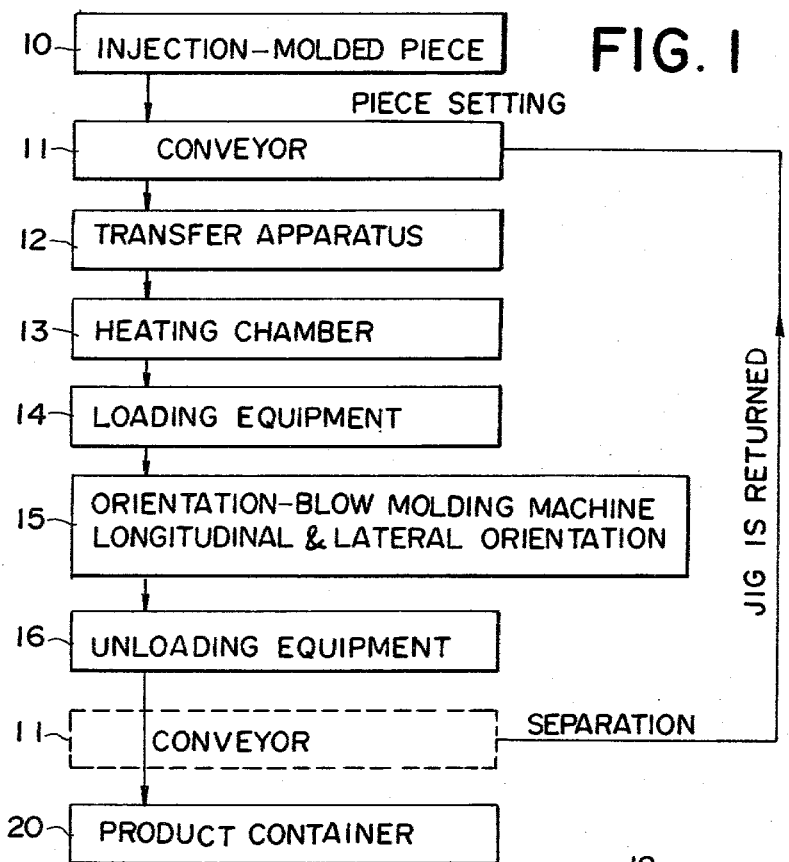
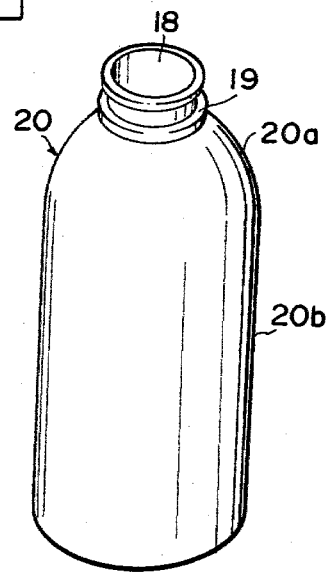

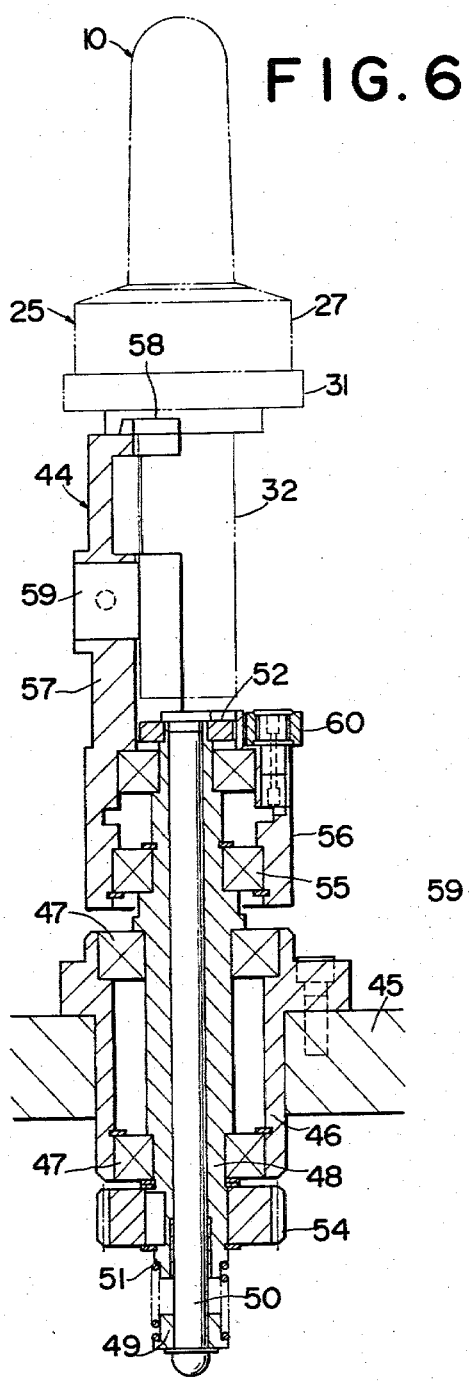
FIG. 6
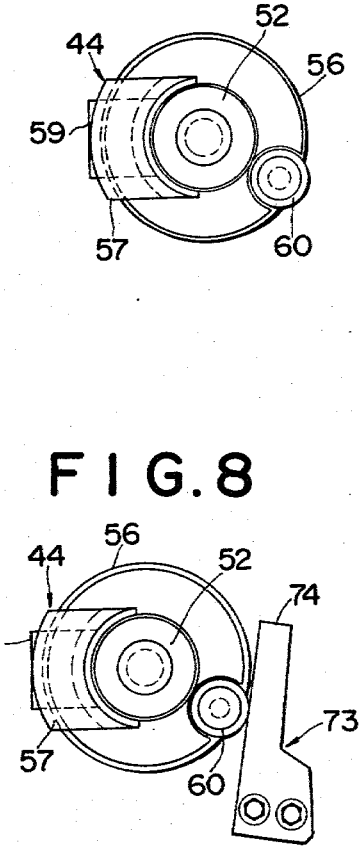
FIG. 7
FIG. 8

ORIENTATION-BLOW MOLDING EQUIPMENT

BACKGROUND OF THE INVENTION

The present invention relates to equipment for producing thin-walled and transparent plastic containers having a high impact resistance by orientation-blowing polyethylene terephthalate.

In ordinary blow molding processes, the upper and lower parts of an extruded parison are held by a mold and compressed air is blown into the thus held parison to radially expand the same for forming it into a container or the like product.

In such processes, however, since the parison is oriented only uniaxially, the resultant products are inevitably inferior in their strength or transparency. Accordingly, a so-called orientation-blow molding process in which a parison is oriented both laterally and longitudinally produces a blow-molded container having an increased strength and toughness as well as improved gas impermeability and transparency. The orientation-blow molding can be roughly divided into an extrusion blow molding process using an extruded parison and an injection blow molding process using an injected parison. The extrusion blow molding process is rather complicated because it requires more steps including pipe extrusion, cooling and cutting to obtain a cold parison, reheating of the parison, top and bottom forming, longitudinal orientation, and blowing. While, the injection blow molding is relatively simple because it contains a less number of steps such as parison injection, cooling, reheating, longitudinal orientation, and blowing. The present invention is based on the latter process, namely, injection blow molding.

SUMMARY OF THE INVENTION

The present invention has as an object to provide equipment which can produce in a simplified manner plastic containers having excellent strength, toughness and transparency by allowing an injected parison (or injection-molded piece) to be evenly heated and accurately oriented both laterally and longitudinally in the mold.

Another object of the present invention is to facilitate processing operations in the aforesaid molding equipment.

In the prior art orientation-blow molding process as described previously, such plastic materials, for example polyethylene terephthalate, have a high crystallizability and show a high rate of crystallization at molding temperatures. The resultant products cannot have a uniform quality because they are susceptible to post-molding shrinkage. Intrinsically, polyethylene terephthalate has a high crystallizability, thermal resistance and weathering as well as chemical resistance, and has a wide range of application to transparent films and textile fibers. In producing containers from polyethylene terephthalate by biaxially orienting the material, it is very important to maintain the material temperature within a range suitable for the orientation. The inventors have successfully improved heating apparatus for the material to be oriented so as to secure an even and uniform heating function.

The material to be processed in the equipment according to the present invention is a polyethylene terephthalate polymer having an intrinsic viscosity of at least 0.55 or its crystallizable copolymer or mixed polymer. This polymer is first molded through an injection molding machine into an injected parison or injection-molded piece (hereinafter, shall be briefly referred to as piece) of a cylindrical shape having a round closed-end. Preferably, the resultant piece has a crystallinity of 4–7%. This is because if its crystallinity is lower than 4% a sufficient orientation cannot be achieved, while if its crystallinity is higher than 7% it cannot produce a container having the required strength when processed through the succeeding biaxial orientation. Thus, an injected piece of polyethylene terephthalate polymer having a crystallinity of nearly 5% will result in a desired result.

The aforesaid plastic piece is fed into a heating chamber to be heated to a temperature lower than the crystalline melting point of the plastic material, namely, in the range of 140°–220° C. before being transferred to the succeeding blow-molding step. In the heating chamber, a large number of core metals for holding a jig to be described later are disposed so that they can be recirculated. Further, several sets of bare heaters and heat exhausting dampers are disposed along the course of the recirculated core metals in such a manner that they divide the heating chamber into several temperature zones for permitting the heating temperature to be controlled stepwise thereby. For example, the first zone has a maintained temperature of 140°–160° C., the second zone a maintained temperature of 160°–190° C., the third zone a maintained temperature of 200°–220° C., and the fourth zone a maintained temperature of 180°–200° C.

The plastic piece passes through the heating and molding processes while being attached to the jig with its neck portion side down. In the heating process, such special core metals that advance in the heating chamber while holding the mandrel of the jig and that can impart a rotational movement to the jig are used for heating the piece evenly and uniformly. The jig is composed mainly of a mandrel, neck support and core shaft for orientation. The mandrel is that part of the jig which is engaged with holding parts of a conveyor, core metals, loading and unloading devices and also functions to support the piston of the core shaft. The neck support is used to hold the neck of the piece and constitutes and embracing (closing) part together with the mold. The core shaft is provided to longitudinally orient the piece by an upward movement of a cylindrical rod disposed at the underside and to radially orient the piece by introducing compressed air through air holes formed in the core shaft into the piece, in a state in which the jig is placed in the mold. Those parts to be assembled onto the jig other than the mandrel may be changed in accordance with the shape and size of the moldings.

Prevention of an irregular temperature distribution due to partial cooling of the heated piece when it is transferred from the heating apparatus to the mold gives a desirable result for the succeeding biaxial orientation. For this purpose, according to the present invention, a shielding plate which is synchronously rotated without contacting the piece moving from the exit of the heating apparatus is provided for preventing the piece, coming out from the exit with no more rotation, from being partially heated.

The mold is provided in plurality spaced at an equal interval on the peripheral part of a large turntable which is tactically rotated. Each mold can be separated into two sections along the longitudinal direction, as usual. At the lower part of the mold, there are provided a piston rod which moves upwardly, the core shaft of the jig for axially orienting the piece and a compressed air feeding device for radially orienting the piece.

BRIEF DESCRIPTION OF THE DRAWINGS

FIG. 1 is a block diagram illustrating a relationship between the components of orientation-blow molding equipment according to the present invention;

FIG. 6 is a section of a core metal used in the present invention;

FIG. 7 is a plan view of the core metal of FIG. 6;

FIG. 8 is a plan view of a brake device used in the present invention;

FIG. 11 is a perspective of a product container which is molded by the equipment according to the present invention.

DESCRIPTION OF THE PREFERRED EMBODIMENTS

Figure 2:
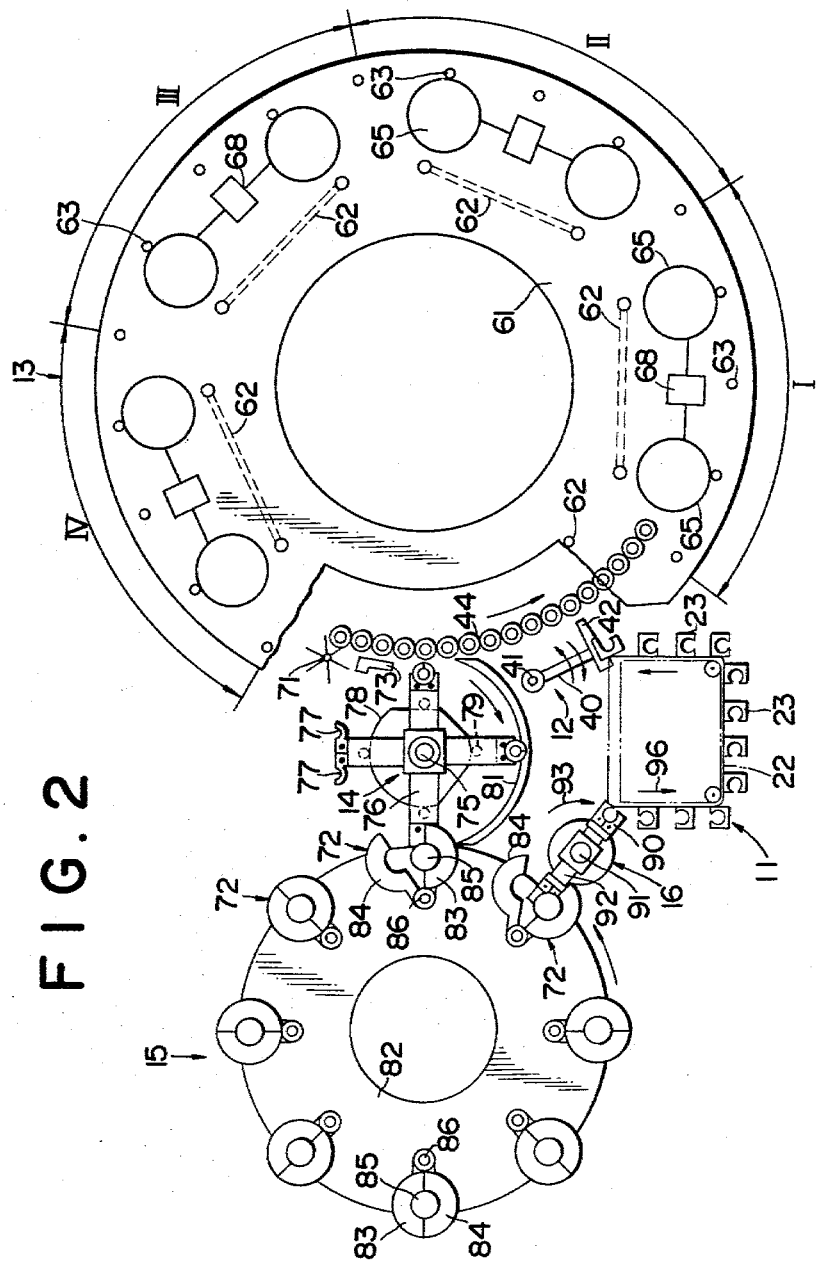
FIG. 2 is a partially broken plan view of the equipment according to the present invention.

In the description of the preferred embodiments of the present invention, a case in which polyethylene terephthalate is used as the plastic material and its injected parison (piece) having a shape of a closed-end cylinder is biaxially oriented to be formed into a transparent thin-walled container.

Referring now to the accompanying drawings, especially, to FIG. 1 it illustrates the components of the orientation-blow molding equipment according to the present invention in the sequence of processing steps. The piece 10 having a closed-end cylindrical shape which is prepared by the preceding injection molding step and cooled is set upside down onto a jig which is carried in on a conveyor 11 and, then, the jig with the piece is fitted by a transfer apparatus 12 onto a core metal which is recirculated in the heating chamber 13. In the heating chamber 13, the piece 10 is heated at a temperature lower than the crystalline melting point of polyethylene terephthalate so as to avoid causing irregular temperature distribution in it. At the exit of the heating chamber 13, to avoid the thus heated piece 10 from being partially cooled, it is given a rotational movement by the core metal and, as it is rotated, it is loaded by loading equipment into the mold of an orientation-blow molding machine 15. Immediately after the mold is closed, an orienting means (core shaft) extending in the axial direction of the piece is actuated to axially (longitudinally) orient the same and, then, compressed air is blown into the piece to radially (laterally) orient it. Thereafter, the mold is opened, and the jig holding the thus biaxially oriented piece is taken out by unloading equipment 16. The jig and piece are transferred onto the conveyor 11, where a molded container 20 is released from the jig. The thus separated jig is returned on the conveyor 11 to the original piece setting step.

[INJECTION-MOLDED PIECE]

Figure 4:
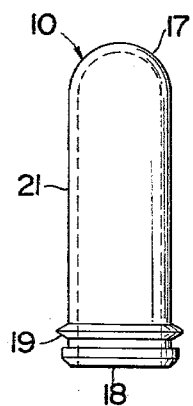
FIG. 4 is a front view of an injected parison (piece) used in the present invention.

The injection-molded piece 10 is an intermediate molding cooled to an ambient temperature after being molded by an injection molding machine (not shown). As shown in FIG. 4, it has a round bottom 17 at its upper end (as seen in FIG. 4) and a circular protrusion 19 for mounting later a cap (not shown) of the container along its periphery in close proximity to its neck opening 18. Also, the piece has a barrel portion 21 having its diameter gradually reduced from the neck opening 18 toward the bottom 17.

[SUMMARY OF THE ORIENTATION-BLOW MOLDING EQUIPMENT]

Referring now to FIG. 2 which is a plan view in its entirety of the orientation-blow molding equipment according to the present invention, the molding equipment according to the present invention mainly comprises a conveyor 11, transfer apparatus 12, heating chamber 13, loading equipment 14, orientation-blow molding machine 15, and unloading equipment 16.

The conveyor 11 comprises an endless chain 22 which is provided with a plurality of attachment hooks 23 equally spaced apart from each other and each having an almost rectangular U-shape. These attachments support a mandrel 26 of a jig 25 to be described later. The aforementioned piece 10 is set onto the jig 25 which is carried by the conveyor 11. That is to say, as shown in FIG. 5, the piece 10 is held in its inverted position so that the neck opening 18 of the piece 10 is positioned at the neck support 27 of the jig 25.

[JIG]

Figure 5:
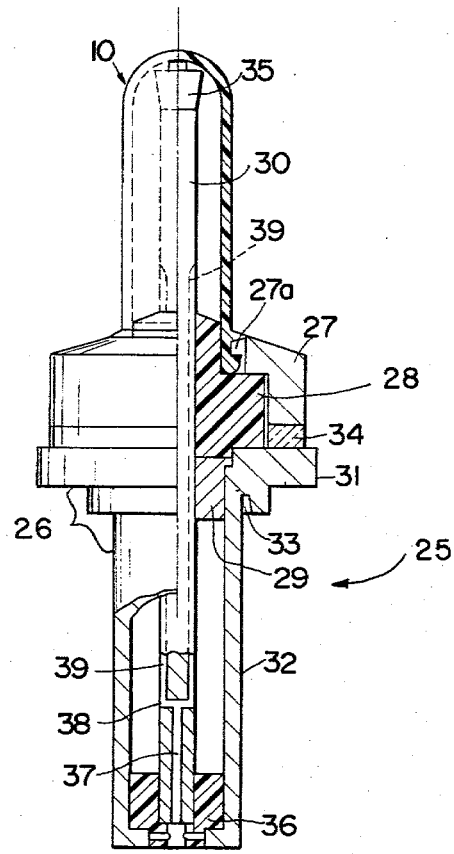
FIG. 5 is a partially broken front view of the jig according to the present invention, showing its state in which the piece is attached thereto.

As shown in FIG. 5, the jig 25 mainly comprises the mandrel 26, neck support 27, a core guide 28, spacer ring 29, and core shaft 30 for orientation.

The mandrel 26 is composed of a disk 31 of swordguard shape, a cylinder 32 extending downward from the disk 31, and a circular groove 33 formed between the disk 31 and cylinder 32. The neck support 27 has the function of supporting the outside of the neck opening 18 and is disposed above a heat-insulating plate 34 provided on the top of the disk 31 of the mandrel 26. The core guide 28 which is disposed in the neck support 27 is made of Teflon or like synthetic material for permitting the core shaft 30 passing through the center thereof to be guided smoothly in its upward or downward movement. Onto the underside of the core guide 28, there is fitted a spacer ring 29 for adjusting the stroke of the core shaft 30. While, at the upper end of the core shaft 30, there is provided a core top 35 made of a heat-insulating material (e.g. Teflon) having an inverted taper shape (inverted frusto-conical shape) for cutting off the heat conduction to and from the piece 10 and for preventing the latter from sticking onto the core shaft when it is subjected to the longitudinal orientation. Also, the core shaft 30 is provided at its lower end with a nozzle holder 36 of piston shape which is fitted into the cylinder 32 of the mandrel 26. Inside the lower part of the core shaft 30, a hole of T-shape in section is bored, and two air passages 30 of spline shape extend along the outside surface of the shaft upwards from the transverse openings 38 of the T-shape hole 37.

Instead of air passages 39 being of spline groove shape, a passage could pass through the center of the core shaft 30. However, since the blow pressure used in the equipment is as high as 50 kg/cm², a sufficient wall thickness and, therefore, mechanical strength cannot be obtained with such a core shaft of hollow structure having a central air passage. Also, since pores would have to be provided at right angle or obliquely to the side wall in such a hollow type core shaft, air jets directed outwardly from such pores causes dimple flaws on the inner wall surface of the piece. While, if the air passages are of spline shape on the outside surface of the core shaft as are the air passages 39 according to the present invention, air jets are not concentrated locally and, thus, the inner wall of the piece is free of the possibility of suffering dimple flaws.

The jig 25 holding the piece 10 makes the rounds of all processing steps and is used in a recirculated manner. The core shaft 30 of the jig 25 is loaded in the mold loading equipment 75 in the orientation process to be described later and, as shown in FIG. 5, it is moved upwards by the actuation of a cylinder rod 88 provided on the mold for longitudinally orienting the piece 10. Further, compressed air is blown from the cylinder rod 88 through the T-shape hole 37 and air passages 39 into the inside of the piece 10 for radially orienting the same.

[TRANSFER APPARATUS]

The jig 25 on which the piece 10 as shown in FIG. 4 is set is fed on the conveyor 11 to the transfer apparatus 12.

The transfer apparatus 12 is provided with an arm 40 which has at its front end a hook for holding the cylinder 32 of the jig 25 and which is pivotally rotated around a fulcrum 41. Inside the locus of the hook motion there is, provided an arcuate guide rail 42 having a magnetic piece for imparting a slight rotational motion to the jig 25 being moved so as to cause it to be engaged with and held by the core metal 44 in the heating chamber 13.

[CORE METAL]

The core metal as shown in FIGS. 6 and 7 comprises a hollow holder 46 attached to a rotary disk 45 and a hollow shaft 48 held by the holder 46 via a pair of bearings 47. An ejector pin 50 is inserted through the hollow shaft 48. Onto the lower end of the ejector pin 50, is fixed a ring 49. A spring 51 for pulling down the shaft 48 is interposed in its contracted state between the ring 49 and the lower end of the shaft 48. Onto the upper end of the ejector pin 50, is attached a disk having a diameter larger than that of the shaft 48 for stopping the lowering of the ejector pin 50. The ejector pin 50 is pushed upwardly by action of a cam (not shown) to lift the jig 25 when the jig is to be removed from the core metal 44 at the exit of the heating chamber 13 in the manner to be described later in detail.

Figure 3:
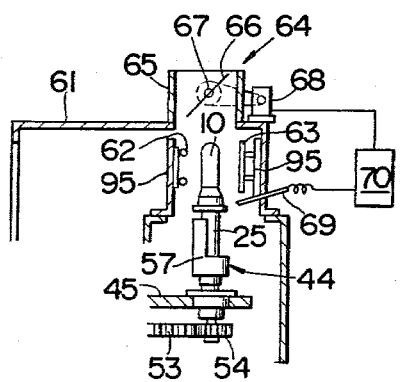
FIG. 3 is a longitudinal section of a heating apparatus used in the present invention.

At the lower end portion of the hollow shaft 48, there is provided a pinion 54 which is engaged with a gear 53 as shown in FIG. 3. Thus, as the gear 53 is rotated, the pinion 54 is also rotated. The upper part of the shaft 48 hold a cylindrical body 56 via a pair of bearings 55, and a portion of the cylindrical body 56 is extended so as to integrally form a support holder 57. The support holder 57 is slightly longer than the cylinder 32 of the jig 25 and has at its upper end an arcuate projection 58 which engages with the circular groove 33 of the jig 25. Also, a magnetic piece 59 which magnetically attracts the cylinder 32 is attached to an almost central part of the support holder 32. Further, a cam follower 60 of roller shape is mounted onto the upper end face of the cylindrical body 56 at a position thereon almost opposite to the support holder 57. This cam follower 60 is arranged so as to be brought into contact with a braking device 73 provided at the exit of the heating chamber 13 to be described herein below.

[HEATING CHAMBER]

As shown in FIGS. 2, 3 and 6, the heating chamber 13 comprises the rotary disk 45 on which a plurality of core metals 44 are attached along its peripheral edge and a cover 61 placed over it. The heating chamber 13 is divided into several heating zones, for example four zones, i.e., I, II, III and IV, which are disposed along the transfer course of the core metals 44 covered by the cover 61 and can be individually controlled, so that the piece attached onto the jig 25 is heated under optimum conditions for the succeeding orientation process.

In each heating zone, several (two, each one at an upper and lower position) bar heater elements comprising IR heating tubes 62 are horizontally provided on the interior side of the transfer course of the metals 44. While, on the exterior side of the transfer course, a plurality of IR heating tubes 63 are vertically provided. Also, a heat-exhaust damper unit 64 is provided on the upper side of the cover 61 at each heating zone. That is to say, a set of two heat-exhausting stacks is provided and a damper 66 is pivotally mounted in each heat-exhausting stack on a shaft 67 which is associated with a driving device 68. The temperature of each heating zone of the heating chamber is detected by a thermocouple 69 as shown in FIG. 3 which is electrically connected to a control unit 70. The control unit 70 issues an instruction to drive the driving device 68 for opening or closing each damper 66 depending upon the detected temperature so as to control the heating zone temperature to a preset temperature.

For example, each zone of the heating chamber is set to the following temperature:

| | |
|---|---|
| zone I | 140° C.–160° C. |
| zone II | 160° C.–180° C. |
| zone III | 180° C.–220° C. |
| zone IV | 160° C.–200° C. |

As shown in FIG. 3, the core metal 44 is held at the peripheral portion of the disk 45. As described previously, the pinion 54 provided at the lower end of the jig 25 is engaged with the gear 53. Thus, as the disk 45 turns, the gear 53 also is rotated to give the core metal 44 a rotation and revolution.

[SHIELDING PLATE]

As shown in FIG. 2, a shielding plate 71 is provided at the exit of the heating chamber 13. The shielding plate has radial fin members which are rotated synchronously with the movement of the core metal 44 to prevent the thermal atmosphere around the exit of the heating chamber 13 from suddenly being disturbed. The piece 10 which has advanced to the exit of the heating chamber 13 while being rotated is then moved while being fenced by the fins and its rotation is stopped. In this case, the fins act to prevent a partical heating of the piece 10.

[BRAKING DEVICE]

At a position succeeding to the shielding plate 71 at the exit of the heating chamber 13, there is provided a braking device 73 for stopping the rotation of the core metal 44. As shown in FIG. 8, the braking device 73 comprises a cam plate 74 and a spring. The cam plate 74 is brought into contact with the cam follower 60 of the core metal 44 to brake the rotation of the core metal in such a manner that the support holder 57 of the core metal forces toward the center of the heating chamber. The core metal 44 has its position controlled so that the unheld portion of the cylinder 32 of the jig 25 faces away from the center of the heating chamber so that it can be accurately held by the holding means 77 upon loading.

[LOADING APPARATUS]

As shown at the central part of FIG. 2, the loading apparatus 14 comprises a mechanical manipulator having four rotary arms. That is to say, four arms 76 are mounted an a rotatable shaft 75. Each arm 76 is provided with a pair of holding means 77 at its free end. Also, each arm 76 has a cam follower 79 which, as the rotatable shaft 75 is rotated, contacts a cam 78 so as to extend or contract the arm 76 and to open or close the holding means 77 in accordance with the configuration of the cam 78.

At a position somewhat advanced from the exit of the heating chamber 13, the holding means 77 are closed, and the jig 25 is removed from the core metal 44 and the arm 76 is contracted towards the shaft 75. Then, the arm 76 is extended to its initial length while being turned in the direction of arrow 80. An arcuate guide rail 81 for guiding the rotation of the holding means 77 is provided along the circumference of the semicircle drawn by the free end of the arm 76. On the inner surface of the guide rail 81, there is mounted a magnetic piece for attracting and holding the cylinder 32 of the jig 25 so that the jig 25 is rotated to prevent the partial cooling of the piece 10 when the arm 76 turns. The piece 10 with the jig 25 held by the free end of the arm 76 is placed in the mold 72, where the jig 25 is released from the holding means 77 and inserted into the cavity 87 of the mold 72. From that position where the piece 10 is inserted into the mold 72, through the circumference of the semicircle opposite to the guide rail 81, to the other position where the braked and stopped jig 25 is caught, the holding means 77 on the arm 76 maintain their opened state. When the jig 25 held by the holding means 77 is pulled towards the shaft 75, the piece 10 held on the opposite arm is charged in the mold.

ORIENTATION-BLOW MOLDING MACHINE

The orientation-blow molding machine 15 is of a rotary station type, in which the mold 72 is provided at each of eight stations on a turntable 82. However, it is to be noted that the number of stations are not necessarily limited to eight as in the illustrated embodiment, but ten or more stations may be provided as well.

Figure 9:
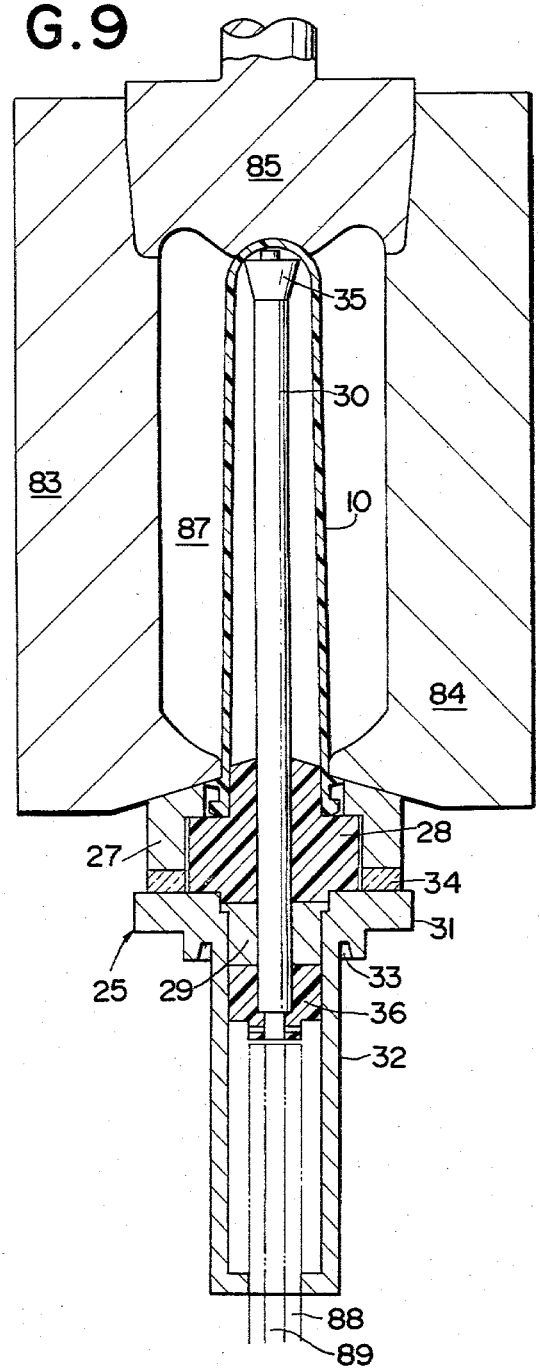
FIG. 9 is a longitudinal section of the mold showing a state in which the piece is longitudinally oriented.

As shown in FIG. 9, the mold 72 comprises two mold halves 83 and 84 separable in the longitudinal direction and an upper mold member 85. One mold half 83 is fixed, while other mold half 84 is pivotally movable about a pivotal shaft 86 as shown in FIG. 2. The mold 72 is opened at the first and eighth stations, while it is kept closed at the second through seventh stations. As a matter of course, the upper mold member 85 is moved upwardly and downwardly correspondingly as the mold 72 is opened and closed.

Beneath the mold 72, there is provided a cylinder rod 88 which pushes up the core shaft 30. A compressed air introducing hole 89 is longitudinally passed through the cylinder rod 88. The cylinder rod 88 pushes up the core shaft 30 at the second station for longitudinally orienting the piece 10 and compressed air is introduced through the hole 89 into the piece 10 at the third station for laterally orienting the same. Thereafter, the cylinder rod 88 is lowered at the seventh station.

[UNLOADING]

The mold 72 is opened at the eighth station of the blow molding machine, where the jig 25 holding the biaxially oriented product is exposed outside. Then, the cylinder 32 of the thus exposed jig 25 is caught by a pair of holding means 90 of the unloading equipment 16 having two rotary arms to be taken out from the mold 72. The unloading equipment 16 has its two arms 92 extended diametrically from a member supported on a its rotatable shaft 91, and the openable and closable holding means 90 are mounted at the free ends of the arms 92. The jig 25 taken out from the mold 72 at the eighth station is held by the holding means 90 and moved along the direction of arrow 93 to be caught by the hook 23 of the conveyor 11, where the container 20 is removed from the jig 25.

[OPERATION]

First, an empty jig 25 is transferred by the conveyor 11 as shown in FIG. 2 to the setting position, where the injection-molded piece 10 is mounted onto the jig 25 in its inverted position, as shown in FIG. 5. The piece 10 has its neck opening 18 gravitationally inserted into the gap 27a between the neck support 27 and core guide 28 of the jig 25. For this purpose, a depressing means (not shown) which functions to interlock with the transfer apparatus 12 is provided at a position immediately succeeding to the transfer apparatus for lightly pushing down the piece 10 from above to ensure that its neck opening 18 is fitted in place onto the jig 25.

The transfer apparatus 12, with a swing motion of its arm 40, transfers the jig 25 holding the piece 10 to the core metal 44. The apparatus 12 is provided with a guide rail 42 having a magnetic piece and drawing a gentle arc.

The jig 25 mounted onto the core metal 44 by the transfer apparatus 12 is gravitationally engaged therewith in the state as shown by the chain line in FIG. 6 and moved through the heating chamber 13 while having a rotation and revolution imparted thereto from the gear 53 and pinion 54.

In this case, as described previously, such a jig that cannot be sufficiently engaged by gravity with the core metal due to strong magnetism of the magnet piece 59 of the core metal 44 is lowered to a predetermined position by pushing down the upper end of the piece with the afore-mentioned depressing means (not shown).

After entering the heating chamber 13, the jig 25 is advanced from the entrance near the transfer apparatus 12 towards the exit of the chamber 13 while being rotated by the rotation and revolution of the core metal 44. In the heating chamber 13, the piece 10 mounted on the jig 25 is heated in sequence at the respective heating zones to render optimum temperature conditions for the succeeding orientation process. As mentioned previously, two or three heating tubes 62 are horizontally provided on the inner side of each heating zone, while several vertical heating tubes 63 are provided on its outer side. These are necessary because the temperature will be undulatingly distributed along the vertical direction of the piece 10 if only the lateral heating tubes are used, while a chevron-like distribution having its peak at the longitudinal center of the piece and gradually reduced temperatures towards its upper and lower ends will appear if only the vertical heating tubes are used. Thus, in the blow molding equipment according to the present invention, a combination of vertical and horizontal heating tubes are adopted to secure an even and uniform temperature distribution over the entire piece. These heating tubes 62 and 63 are mounted by the use of an assembly 95 (FIG. 3) with stands and screws so that their mounting positions can be finely adjusted both laterally and longitudinally and both in the vertical and horizontal directions. The heating chamber 13 thus heated by the vertical and horizontal heating tubes 62 and 63 has its temperature adjusted by the operation of the heat-exhausting damper 66 provided on the top of the cover. That is to say, the temperature of each heating zone of the heating chamber 13 is detected by the thermocouple 69, as shown in FIG. 3, which is connected to the control unit 70. The driving device 68 is actuated by an instruction from the control unit 70 for opening or closing the damper 66 to correspondingly control the temperature of the heating zone.

The piece 10 evenly heated in the heating chamber 13 is advanced towards the exit of the chamber 13 while being rotated and, when the core metal 44 comes up to the braking device 73 provided adjacent to the shielding plate 71, the cam follower 60 comes into contact with the cam plate 74 and core metal 44 is stopped with the non-contacted portion of cylinder 32 of the jig 25 being positioned to face away from the center of the heating chamber 13.

The core metal 44 thus stopped by the braking device 73 actuates the ejector pin 50 provided below to move the jig 25 upwardly and, at the same time, closes the holding means 77 of the loading equipment 14 positioned at that position where the core metal 44 is stopped for causing the holding means 77 to catch the cylinder 32 of the jig 25. Then, the arm 76 is contracted and pivotally moved along the guide rail 81 to fit the jig 25 into the cavity 87 of the mold 72. The guide rail 81 has a magnet piece which attracts and holds the cylinder 32 of the jig 25 for continuously rotating the same as it is pivotally moved by the arm 76.

As described previously, in the illustrated embodiment mold 72 has eight stations. The jig 25 onto which the heated piece 10 is mounted is placed into the opened mold 72 and the mold is closed at the first station. Then, as the mold 72 is being moved towards the second station, the core shaft 30 is pushed upwardly to longitudinally orient the piece 10. Since the core shaft 30 has a core top 35 of inverted taper shape, the piece will not be punctured by the core shaft 30. Thus the piece 10 is longitudinally oriented properly by the core shaft as it is pushed upwardly.

Figure 10:
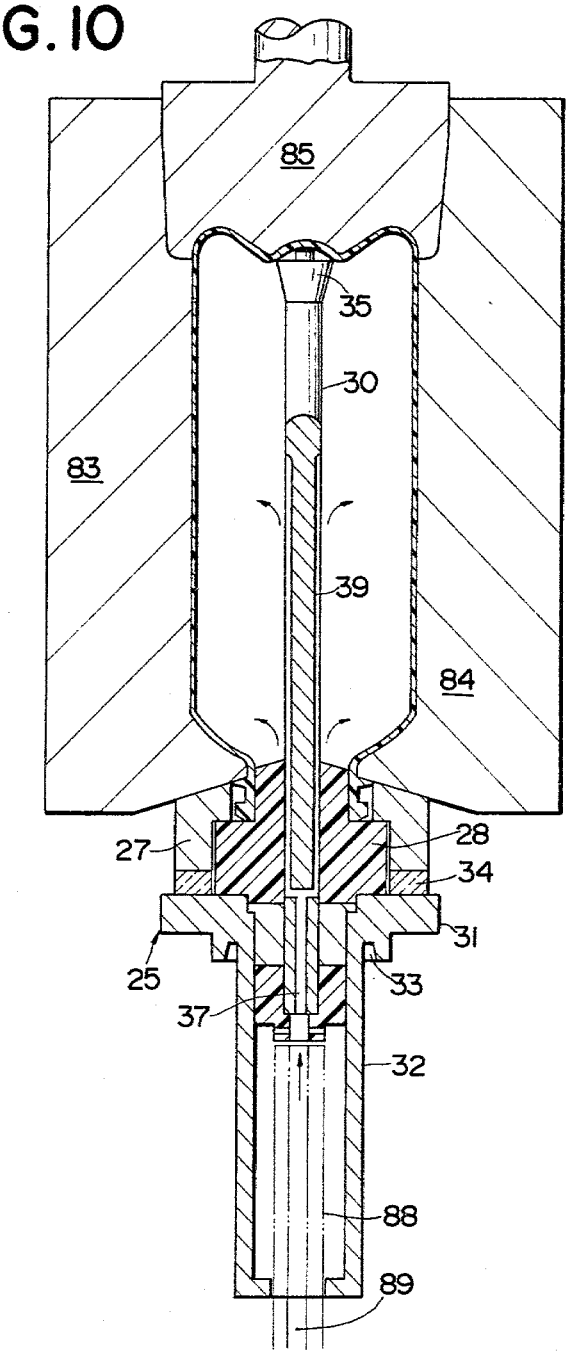
FIG. 10 is a similar longitudinal section of the mold showing a state in which the piece is laterally oriented.

Then, as shown in FIG. 10, compressed air is introduced through the air passage 39 formed in the core shaft 30 into the piece 10 for laterally orienting the same.

The air passages 39 are formed as spline grooves on the outside of the core shaft 30. Instead of the spline groove, a longitudinal hole opened at the side may be bored through the center of the core shaft 30. However, in a core shaft of such a hollow structure, the core shaft 30 cannot have a sufficient wall thickness and its mechanical strength will be insufficient when it is pushed up under high blow pressure such as 50 kg/cm$^2$ or above. In addition, if compressed air is blown out through pores formed orthogonally or obliquely in the side wall of such a hollow type core shaft, compressed air will cause dimple flaws on the moldings. Such dimples will remain and damages the commercial value of the container.

Alternatively, instead of the spline several air passage grooves may be formed in the inner peripheral surface of the core guide. However, such a structure has working disadvantages.

In the second through seventh stations, the mold and jig are kept in the state as shown in FIG. 10. At the eighth station, the mold 72 is opened and the jig 25 holding a molded piece is taken out of the mold 72 by the unloading equipment 16 having two arms as shown in FIG. 10. As described previously, the unloading equipment 16 is provided with the rotatable shaft 91 having positioned diametrically two arms 92 at its upper end. The arms 92 have holding means 90 at their free ends. The unloading equipment 16, with its holding means 90, catches the jig 25 at the eighth station and transfers it to the conveyor 11.

After being transferred to the conveyor 11, the molded piece (container) is moved upwards to be released from the jig 25. Then, the emptied jig 25 is carried by the conveyor 11 in the direction of arrow 96 and, during the course of this, a new injected parison (piece) is mounted onto the jig 25, and the new piece undergoes the same processings of heating and orientation as those undergone by the previous piece.

FIG. 11 shows a product container 20 molded by the orientation-blow molding equipment according to the present invention. As shown in FIG. 10, the container 20 has a neck opening 18, a cylindrical barrel 20b having almost the same diameter throughout its length and a shoulder portion 20a extending between the neck opening 18 and barrel 20b in a gradually increasing diameter from its top to its bottom. As described previously, this container is produced by heating an injection-molded piece and orienting it first longitudinally and then laterally. Its barrel portion has almost an uniform wall thickness and the container has an improved transparency and excellent impact resistance owing to the biaxial orientation.

As fully described hereinbefore, since the orientation-blow molding equipment according to the present invention can heat the injected parison (injection-molded piece) evenly and accurately orient it longitudinally as well as laterally in the mold, plastic containers having an improved toughness, strength and transparency can be easily produced by it. Also, since the heating chamber is divided into several heatings zones so that the piece can be heated at temperatures which are controlled stepwise, a heating operation under optimum temperature conditions for the succeeding orientation process is feasible. Further, since the piece mounted on the jig is rotated in the heating chamber for ensuring an even and uniform heating, protected by the shielding plate at the exit of the heating chamber to avoid a partial heating and then put by the loading equipment into the orientation-blow molding machine of rotary statiin type, the molding accuracy can be improved in that the piece can maintain its heating temperature until the orientation and molding process.

In addition, since a jig which has a neck support, mandrel and core shaft and can hold the piece with its neck opening positioned down in the gap between the neck support and core guide, the mounting of the jig onto the core metal in the heating chamber, its mounting onto the mold of the molding machine after its being taken out from the heating chamber and its removal from the mold can be performed more smoothly. Thus the containers can be produced at a higher efficiency with an improved molding speed.

What I claim is:

1. Equipment for producing biaxially oriented containers comprising:

a jig having a neck support which can hold the neck of a plastic piece positioned upside down, a mandrel provided beneath said neck support, and a core shaft for longitudinal orientation of said piece which is provided inside said mandrel so as to be freely movable upwardly or downwardly and which has a blow-molding air passage;

a core metal movable in a continuous path in a heating chamber, said core metal having a cylindrical holder, a hollow shaft freely rotatably supported at the center of said cylinder, a cylinder provided at the upper end of said shaft, a support holder extending from the top of said cylinder for supporting said mandrel of said jig, and a gear provided at the lower end of said shaft for transmitting a rotational motion;

said heating chamber having a rotary disk to which a plurality of said core metals are attached, said heating chamber being provided with several sets of heating elements and heat-exhausting damper devices so as to provide therein several heating zones along the transfer passage of said core metals attached to said rotary disk for heating stepwise said piece mounted on said jig;

a shielding plate having radial fins which are rotated in association with the movement of said core metal for preventing thermal atmosphere at the exit of said heating chamber from being suddenly disturbed and preventing a thermal influence on the piece;

a support holder braking means for stopping the rotation of said core metal, said braking means being provided at a position a predetermined distance apart from said shielding plate in the direction of the rotation of said rotary disk;

a mold loader which catches said jig holding the thermally processed piece for loading the same from the core metal which has stopped rotating by the action of said support holder braking means to a blow molding machine of rotary station type;

a means for rotating said jig while transferring said jig from said heating chamber to said molding machinery;

a blow molding machine of rotary station type having a plurality of molds and provided beneath said molds with a cylinder rod for pushing upwardly said orienting core shaft of said jig placed in each said mold and for introducing compressed air into the same;

a mechanism for pushing up said core shaft;

an unloading means for taking out said jig from said mold placed at the final station of said blow molding machine;

a conveyor having a plurality of attachment hooks for removing the jig from said unloading means to release the molded container from said jig and for catching the mandrel of the thus released jig to mount a new piece thereonto; and a transfer apparatus provided at a corner of said conveyor for mounting said jig which has advanced to said corner onto the core metal positioned at the entrance of said heating chamber.

2. An orientation-blow molding equipment according to claim 1, wherein an ejector pin is inserted in said shaft of said core metal to move upwardly said jig which has advanced to said loader for ensuring a positive holding of said jig while loading, a position opposite to the position where said support holder is mounted on said cylinder.

3. An orientation-blow molding equipment according to claim 1 or 2, wherein said support holder of said core metal is provided with a magnetic piece for attracting the mandrel of said jig to ensure a positive holding of said jig.

4. An orientation blow molding equipment according to claims 1 or 2, wherein said support holder of said core metal has a width equal to half a diameter of said cylinder and a length slightly longer than that of said mandrel of said jig and wherein an arcuate projection on the top of said support holder engages with a shoulder of said mandrel of said jig.

5. An orientation-blow molding equipment according to claim 1, wherein a temperature detecting means is provided in each of said heating zones of said heating chamber and a control unit is provided for controlling the temperature of said heating zone by comparing the thus detected temperature with a preset temperature to correspondingly drive said heat-exhausting damper.

6. An orientation-blow molding equipment according to claims 1 or 2, wherein said heating elements provided in each heating zone of said heating chamber each comprise an infrared heating tube of bar type and a plurality of tubes are disposed horizontally and a plurality of tubes are disposed vertically in each heating zone.

7. An orientation-blow molding equipment according to claim 1, wherein said support holder braking device comprises an arcuate cam plate and a spring which are provided at the exit of said heating chamber so that the cam follower of the core metal is brought into contact with said cam plate for stopping the rotation of said jig always in a position in which said jig supported by said support holder of said core metal faces away from the center of said heating chamber.

8. An orientation-blow molding equipment according to claim 1, wherein said loader has four arms which can be extended or contracted by the action of a cam and a pair of freely openable and closable holding means are mounted on the free end of each said arm for holding said mandrel as it is moved from the exit of said heating chamber to the mold, an arcuate guide rail having a magnetic piece for rotating the jig being provided along the periphery of a circular course which is traced by said jig holding means.

9. An orientation-blow molding equipment according to claim 1, wherein said unloading equipment is provided with a pair of holding means for catching said jig by cam action and holding the same as it is moved from said mold placed at said final station to said conveyor.

10. An orientation-blow molding equipment according to claim 1, wherein said transfer apparatus comprises an arm which is pivotally moved around a fulcrum, a hook provided at the free end of said arm and a guide rail having a magnetic piece and disposed along the periphery of the course traced by said hook.

* * * * *